Sept. 15, 1925.
C. VUGRINEC
DISTRIBUTOR FOR SEED PLANTERS
Filed Nov. 13, 1924
1,554,145
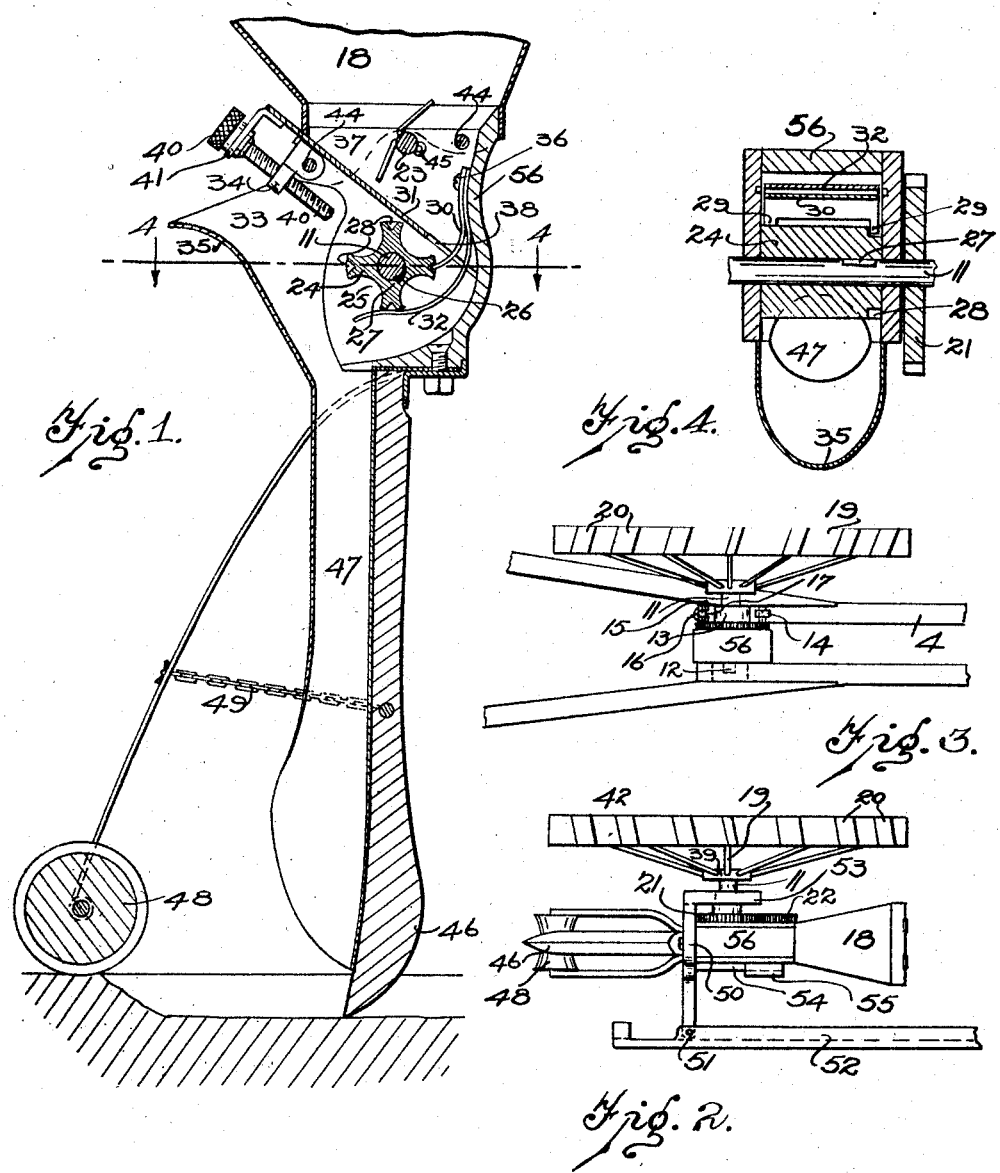
INVENTOR.
Carl Vugrinec.
BY
Gerald Baldwin
ATTORNEY.

Patented Sept. 15, 1925.

1,554,145

UNITED STATES PATENT OFFICE.

CARL VUGRINEC, OF DETROIT, MICHIGAN.

DISTRIBUTOR FOR SEED PLANTERS.

Application filed November 13, 1924. Serial No. 749,780.

*To all whom it may concern:*

Be it known that I, CARL VUGRINEC, a citizen of Jugoslavia, residing at Detroit, in the county of Wayne and State of Michigan, have invented a new and useful Improvement in Distributors for Seed Planters, of which the following is a specification.

My invention relates to improvements in distributors for seed planters.

It is an object of the invention to provide a distributor planter that can be used equally successfully for both large and small seeds.

Another object of the invention is to provide a distributor by which seed is dropped at fixed intervals of distance irrespective of the speed at which the planter is advanced, and by which no seeds will be dropped when the machine is moved backwards.

A further object of the invention is to provide a stirring means in the base of the seed container and above the distributor so that seed cannot become clogged therein.

Still another object of the invention is to provide a seed planter unit so arranged that it can either be used in a small hand operated machine, or so that it can be quickly and easily removed therefrom and mounted either singly, or as one of a gang, on a large power operated machine.

With these and numerous objects in view, my invention, which consists in certain novel construction and combination of parts, is hereinafter more fully described with the aid of the accompanying drawings and claimed.

Figure 1 is a cross section of the distributor showing the internal mechanism.

Figure 2 shows the distributor mounted on a yoke by which it may be secured to a power driven machine.

Figure 3 is an inverted plan of the distributor mounted on a small hand operated seeding machine.

Figure 4 is a cross section on the line 4—4 of Figure 1.

Referring more particularly to the drawings, 4 designates part of the frame of the seeding machine in which the shaft 11 is mounted, preferably in bearings 12 and 13, the latter of which is hinged at 14 and held in closed position by means of a pin 15 which passes through a lug 16 integral with the bearing 13 and also through lugs 17 on the underside of the frame 4.

On the shaft 11 the boss 39 of an ordinary drive wheel 19 is mounted, the rim 42 of which may be provided with teeth 20. A gear 21 is also mounted on the shaft 11 and engages a pinion 22 on the stub shaft 23, which latter is mounted in the side walls 37 of the distributor 56.

The distributor contains a feed wheel 24 mounted on the shaft 11, which has a spring ratchet-like driving member 26 adapted to engage a depression 27 provided in the bore of the feed wheel so that forward rotation of the shaft will cause the feed wheel to revolve, but when the shaft is turned backwards the feed wheel will remain stationary. The feed wheel is provided with pockets 25, the size of which depends upon the size of the seed to be sown. In the accompanying drawings the feed wheel shown has four pockets. For sowing very large seeds a wheel with only two pockets may be used, or for quite small seeds it may be desirable to use a wheel having eight pockets.

One side at least of the feed wheel is provided with notches 28 into which one of the forwardly extending outer edges 29 of the inner spring member 30 is adapted to catch. This spring member achieves two purposes; it acts as a supplementary stop and positively prevents the feed wheel turning backwards, and it also springs upwards every time the edge 29 is released from one of the notches 28 and prevents seed from clogging between the lower end of the adjustable slide 31 and the opposite portion of the said spring member. The purpose of the outer spring member 32 is to constantly maintain pressure against the underside of the feed wheel so as to insure that all the seed that is sown passes through one of the pockets 25.

The opening 33 at the upper back-portion of the distributor is of such dimensions that the feed wheel can be removed between the nut 34 and the rear wall 35 and another inserted by pulling the shaft 11 sideways, preferably in the direction of the drive wheel 19, and releasing the feed wheel therefrom.

Both spring members 30 and 32 are preferably secured to the front wall of the distributor by means of a screw 36. The side walls 37 are provided with inclined guides 38 in which the slide 31 is moved up and down by the screw 40 held in position against the lug 41 and in threaded engagement with the nut 34 secured to the distributor. The slide regulates the size of the opening at its lower end, and so controls the amount of seed that enters the pockets 25 of the feed wheel.

The seed box 18 is secured to the upper side of the distributor as by the bolts 44, and a stirring means such as the pin 45 in the stub shaft 23 rotated through the gearing 21 and 22 prevents the seed from clogging in the bottom thereof.

From the underside of the distributor a furrow opener 46 is arranged, and immediately behind it is the chute 47 down which the seed drops. The concave roller 48 is also hung from the underside of the distributor, and held the desired distance behind the chute by means of chains 49.

In Figure 4 the distributor is shown removed from the frame 4 and supported by a yoke 50, pivotally attached at 51 to the member 52. On one side of the yoke 50 is a fork 53 adapted to support the shaft 11, and on the other side is the projection 54 adapted to fit into the pocket 55 on the side of the distributor 56.

When it is desired to use distributors in gangs on a power driven machine any desired number can be mounted in yokes as shown, and the supporting members suitably attached to the machines. The yoke 50 is pivotally arranged so that when desired a distributor may be turned into a horizontal position as shown in Figure 4 and thus rendered inoperative. It may be necessary to do this at times when the distributor is attached to a machine by which other operations are being done at the same time. The weight of the seed box 18 and its contents prevents the unit from accidently assuming a vertical position.

In the foregoing the preferred embodiment of the invention has been described and shown, it is however understood that the construction is susceptible to alterations and modifications provided the said alterations and modifications fall within the scope of what I claim.

What I claim is:

1. In a seed planter, a dispensing mechanism comprising a feed wheel, a slide having longitudinal adjustment and over said feed wheel, and a spring member secured substantially opposite said slide, so that the distance between said slide and said spring member may be varied, in combination with notches in the outer edges of the periphery of said feed wheel adapted to alternately engage and release forwardly projecting edges on said spring member as said feed wheel rotates, and thus to depress and release said spring member.

2. In a seed planter, a dispensing mechanism comprising a feed wheel, inner and outer spring members secured one over the other, said inner spring member having projecting edges adapted to engage notches in the outer edges of the periphery of said feed wheel and to be alternately depressed and released as said feed wheel rotates, and said outer spring member being adapted to bear against the underside of said feed wheel, in combination with a slide having longitudinal adjustment over said feed wheel so that the distance between the ends of the slide and the inner spring member, located substantially opposite thereto, may be varied.

CARL VUGRINEC.